United States Patent [19]

Rice

[11] Patent Number: 5,511,365
[45] Date of Patent: Apr. 30, 1996

[54] MOWER HEAD ROLLER ASSEMBLY

[76] Inventor: James Rice, 22008 Vine Rd., Brier, Wash. 98036

[21] Appl. No.: 418,791

[22] Filed: Apr. 7, 1995

Related U.S. Application Data

[62] Division of Ser. No. 277,249, Jul. 18, 1994.

[51] Int. Cl.$^6$ .................................................. A01D 34/62
[52] U.S. Cl. .................................................. 56/7; 56/249
[58] Field of Search .................................. 56/7, 249, 294, 56/253; 384/192

[56] References Cited

U.S. PATENT DOCUMENTS

| | | | |
|---|---|---|---|
| 3,624,988 | 12/1971 | Aldred | ........................................ 56/7 |
| 5,326,178 | 7/1994 | Strobl | ...................................... 384/192 |
| 5,360,274 | 11/1994 | Strobl | ...................................... 384/192 |
| 5,394,681 | 3/1995 | Nolan et al. | ............................. 56/249 |
| 5,410,864 | 5/1995 | Lacy et al. | ............................. 56/249 X |
| 5,412,932 | 5/1995 | Schuler | ................................... 56/7 X |

*Primary Examiner*—Terry Lee Melius
*Attorney, Agent, or Firm*—Jensen & Puntigam

[57] ABSTRACT

A roller assembly (12) for use with a mower head (10) is disclosed. The roller assembly includes a roller body (24) to which a shaft (26) is attached such that the body and shaft rotate in unison. The shaft has a pair of opposed ends, each of which is coupled to a bearing assembly (30) that is attached to an arm (28) that is secured to the mower head. The bearing assemblies freely rotate relative to the planes in which they are normally seated so that in the event the arms with which they are associated become out of alignment, the associated shaft and roller body will be able to continue to freely turn. In the preferred versions of the invention, the roller body is made out of ultra-high molecular weight polyethylene plastic. The roller body is further formed out of individual sections. The individual sections are each not more than 15 inches in length and are mated together to form the integral roller body.

18 Claims, 4 Drawing Sheets

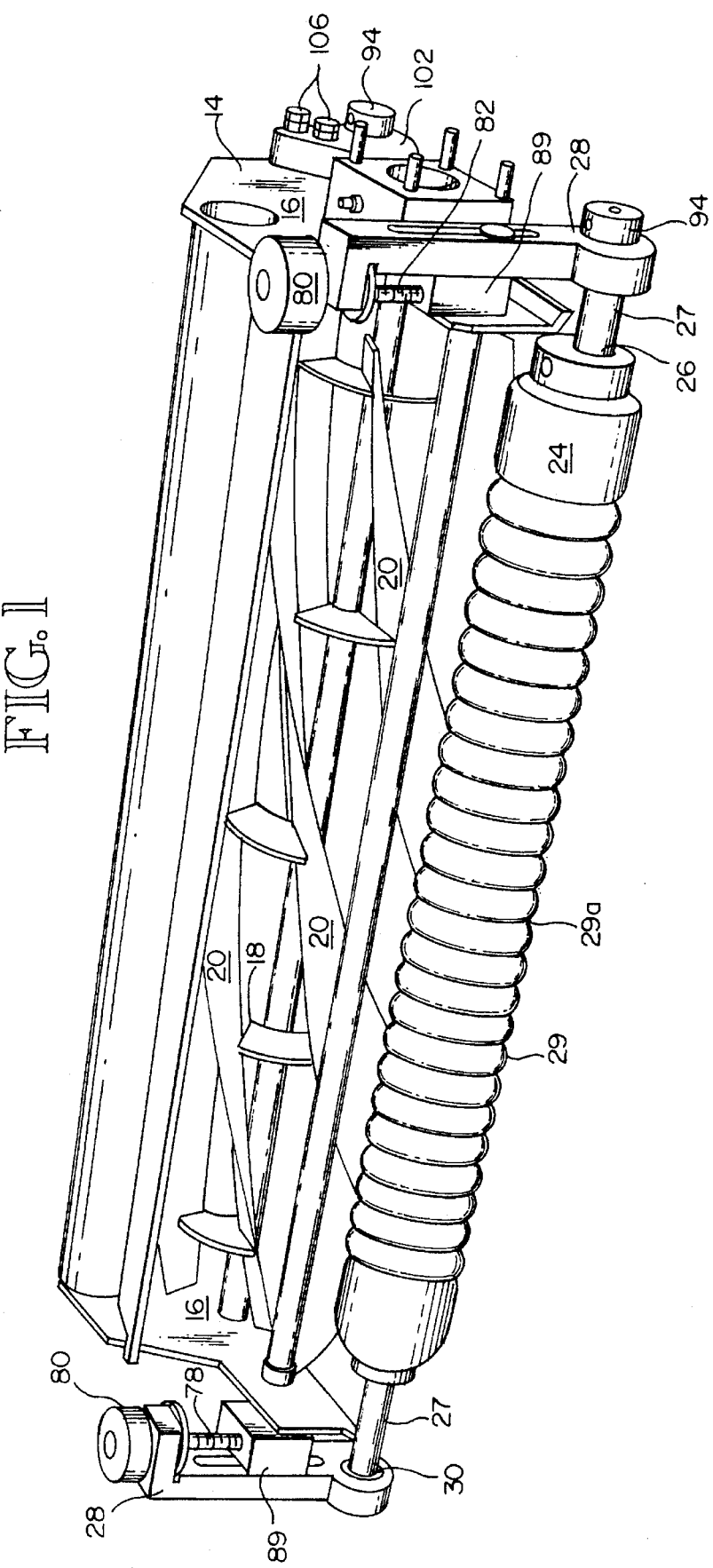

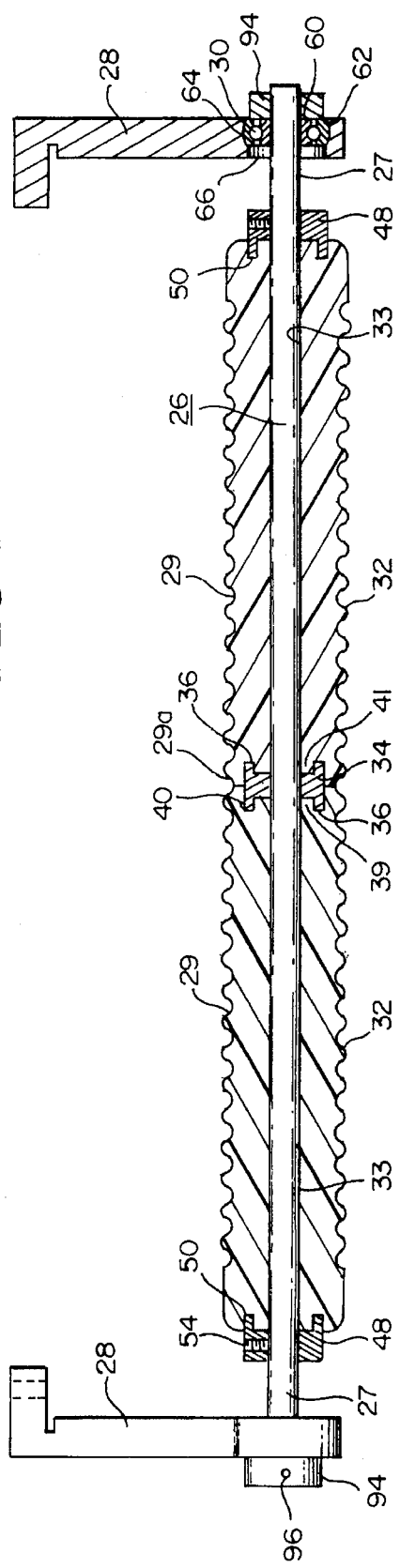
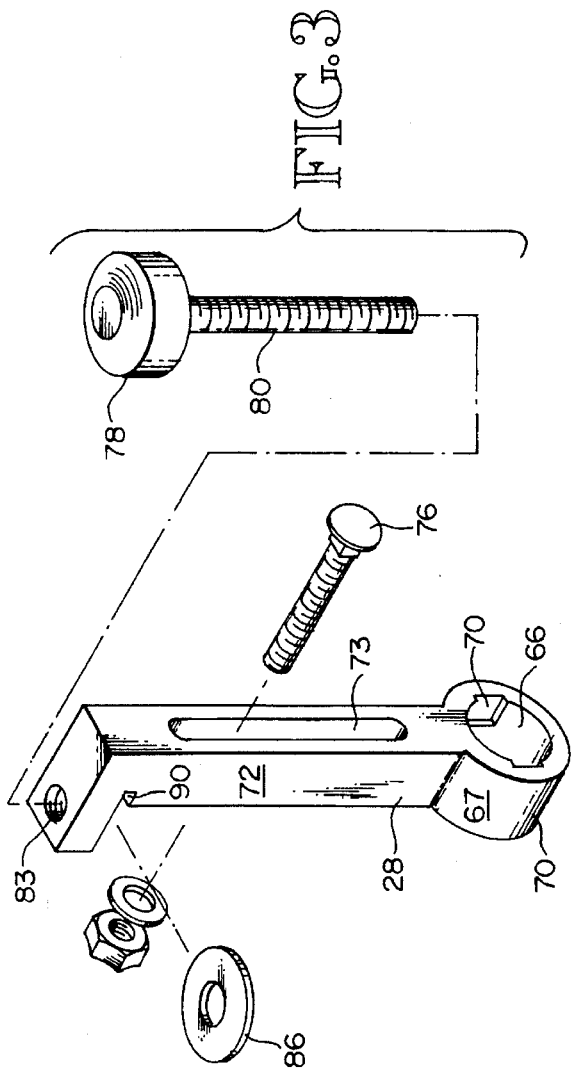

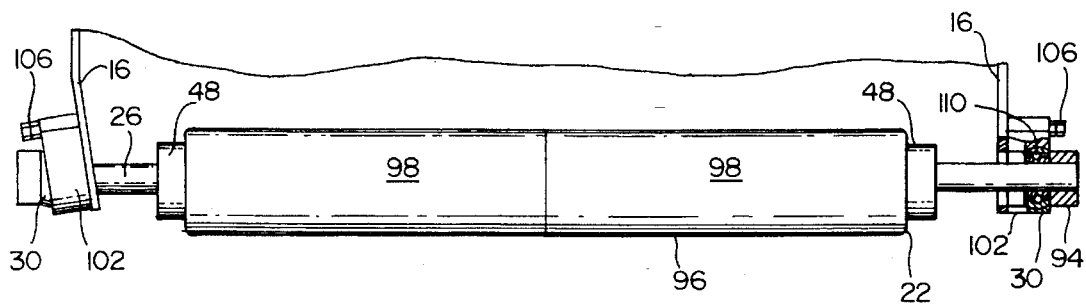
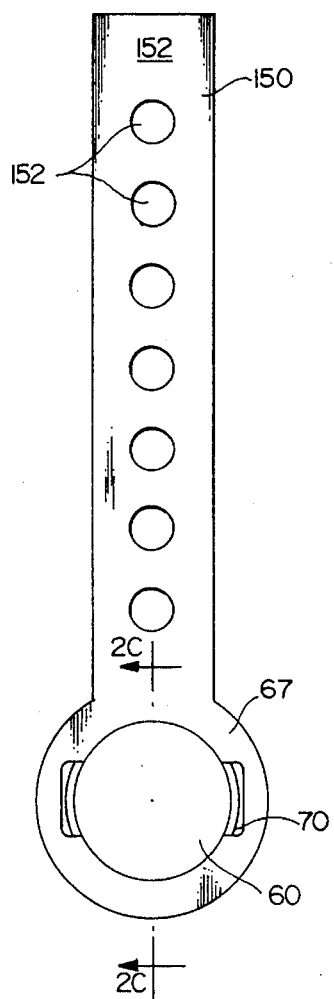
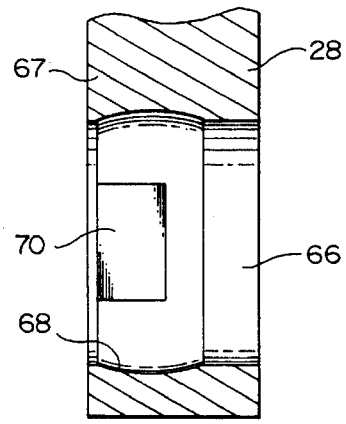

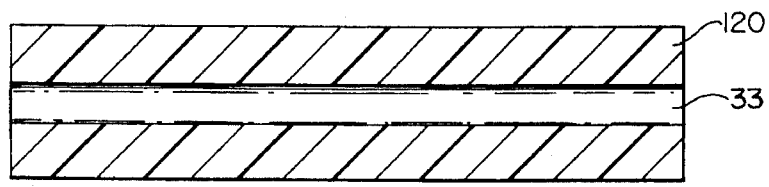
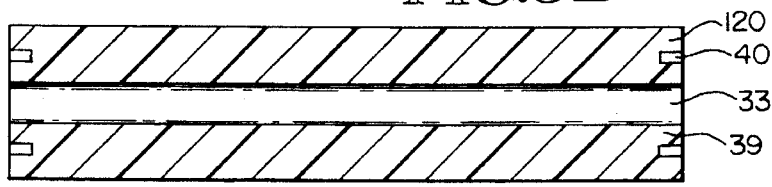
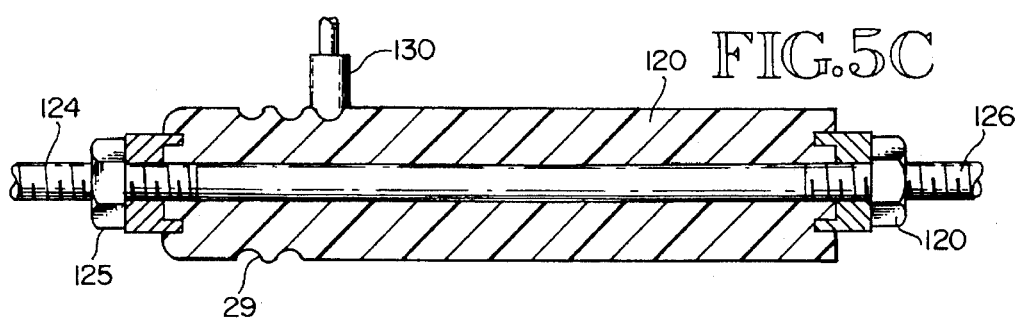
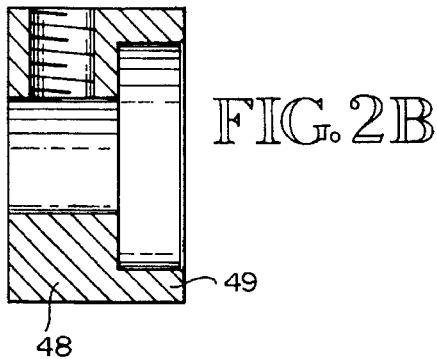
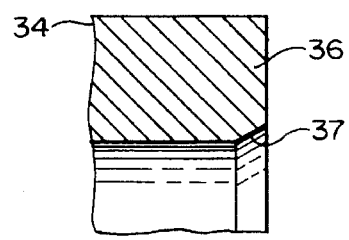
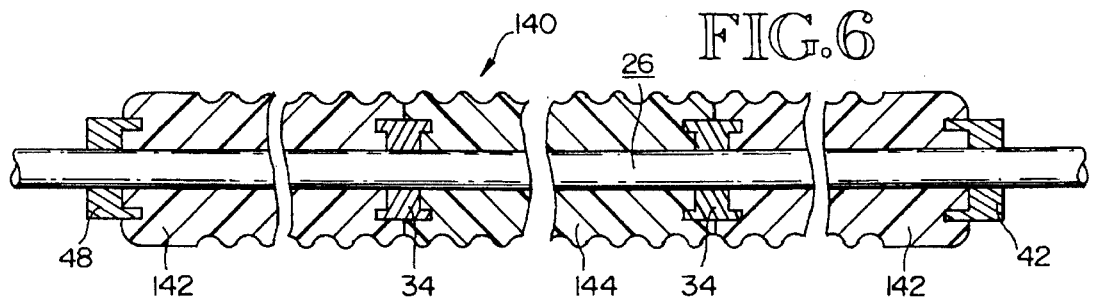

MOWER HEAD ROLLER ASSEMBLY

This is a divisional of application Ser. No. 08/277,249, filed on Jul. 18, 1994.

TECHNICAL FIELD

This invention relates generally to mower heads used to cut grass and, more particularly, to roller assemblies that are attached to mower heads.

BACKGROUND OF THE INVENTION

A mower head is the sub-assembly of a lawn mower that cuts the grass over which the lawn mower travels. At places where there are large areas of grass to be cut, such as at golf courses and parks, lawn mowers take the form of tractors to which a number of mower heads are attached. A typical mower head includes a frame to which the other components of the head are attached. One of these components is a reel, which is an assembly of spiral-shaped blades that functions as the actual cutting element for mowing the grass. A mower head also includes front and rear roller assemblies. Each roller assembly includes a roller body which is designed to roll on the ground over which the mower head travels. One of the roller assemblies is securely attached to the mower head frame; the other of the roller assemblies can be adjustably positioned up or down so as to allow the height of the blades to be selectively set. Typically, but not always a mower head is constructed so that the rear roller assembly is in a fixed position relative to the rest of the head, while the front roller assembly is adjustably mounted to the roller head frame so as to allow selective positioning of the reel and blades.

A problem with many mower heads is that their roller assemblies have proved to be difficult subassemblies to maintain. In order for a mower head to smoothly travel over the grass, its roller bodies must freely rotate. To date, it is common practice to design a roller assembly so that it has a shaft that is fixedly secured to the mower head frame and a roller body that is fitted for rotation around the shaft. To ensure that the roller body freely rotates, bearing assemblies fitted in the roller body function as low friction interfaces between the body and the shaft. A disadvantage of these roller assemblies is that, even with relatively limited use, the grass and dirt to which they are exposed enters their bearing assemblies. In order to maintain the desired low-friction interface, it is necessary to periodically remove these roller assemblies from the mower heads, and partially disassemble them in order to access the bearing assemblies for cleaning. Once the bearing assemblies are cleaned, the roller assemblies must be reassembled and reinstalled on the mower head. This task of having to essentially completely disassemble and reassembly roller assemblies as part of their maintenance has proved to be a labor-intensive activity that requires an inordinate amount of time to perform.

Another problem with these roller assemblies is that the bearing grease introduced into the roller body-shaft bearing assembly has been known to leak out of the roller bodies as these mower heads are used. This necessitates having maintenance personnel remove the grease from the turf on which it is deposited. Often though there is usually some grease left even after the turf is cleaned. This grease then adversely affects the turf and can cause environmental problems since it can easily become a ground water pollutant.

There have been attempts to reduce the efforts associated with having to maintain mower head roller assemblies by constructing them so that the roller bodies and shafts are formed as integral units that rotate in unison. These assemblies are mounted to the mower heads with which they are associated by bearing assemblies that are attached to structural elements of the mower head frame. These mounting structures have, to some extent, reduced the amount of time required to maintain these roller assemblies. These assemblies, however, have their own problems. In particular, problems arise because the bearing assemblies are attached to the structural elements of the associated mower head frames. Over time, as the mower heads are driven over and against hard objects such as tree stumps, rocks, and curbs, these structural elements become bent out of shape. The bearing assemblies attached to these elements fall out of alignment with each other. Once the opposed bearing assemblies holding a roller-and-shaft unit in position become out of align, the assemblies serve not to free the roller-and-shaft unit for rotation but, instead, inhibit the unit's movement. Thus, while, to date, roller assemblies with external bearings may have some reduced maintenance attributes, they are not without their own problems.

There are also disadvantages associated with the actual roller bodies of many roller assemblies. Some roller assembly bodies are made out of metal, such as steel or aluminum. As they are exposed to the elements, over time, these roller bodies have been known to corrode and rust. Still another problem with these bodies is that as they are passed over the hard objects that are in the paths of the mower heads, these assemblies become dented and sometimes lose their shape to the point of no longer being functional. There have been attempts to solve this problem by forming roller bodies out of rubber instead of metal. While rubber roller bodies do not corrode, they can, over time, become misshapen as a result of their own exposure to the hard objects over which a mower head travels. There have also been efforts made to form these rollers out of plastics. A problem with these efforts is that it has proved very difficult and expensive to manufacture the relatively long roller bodies, i.e., bodies of 18 inches and length and longer, that need to be provided for use with many commercial mower heads. Thus, to date, it has also been difficult to provide a roller assemblies with roller bodies that maintain their shape and utility for extended periods of time.

DISCLOSURE OF THE INVENTION

This invention is related to a new and useful roller assembly for installation to a mower head. The roller assembly of this invention includes a roller body with a shaft that extends axially through the roller body and is attached to the roller body such that the body and shaft turn in unison. The assembly of this invention includes a pair of arms that are secured to the frame of the mower head to which the assembly is attached. Self-aligning bearing assemblies, one assembly attached to each arm, provide low friction interfaces between the shaft and the adjacent arm to ensure that the roller body-and-shaft unit freely turns.

Still another feature of the roller assembly of this invention is that the roller body is formed out of plastic, in particular an ultra-high molecular weight polyethylene plastic. In some preferred versions of the invention where the rollers are 15 inches or more in length, the roller body is actually formed out of two or more separate sections. The individual roller body sections are mated together prior to the coupling of the shaft thereto.

A feature of the roller assembly of this invention is that the roller body and associated shaft rotate in unison. The roller body does not include internally located bearings that, in order to be maintained, are accessed by disassembling the roller assembly. It is still another feature of this invention that the since the bearing assemblies are self aligning, they float, or rotate, relative to the arms in which they are mounted. Consequently, in the event an arm to which a bearing assembly is mounted becomes out of align owing, for example, to the bending of the mower head structural element to which it is attached, the bearing assembly will merely shift position. The shifting of the bearing assembly, in turn, ensures that the roller-body-and-shaft unit will still rotate.

Still another advantage of the roller assembly of this invention is that the roller body, which is formed out of a resilient plastic, is able to withstand being exposed to relatively hard objects without becoming significantly dented or otherwise losing its shape.

BRIEF DESCRIPTION OF THE DRAWINGS

The invention is defined with particularity in the claims. The above and further advantages of the roller assembly of this invention will become apparent upon reading the below description of the invention in view of the following drawings in which:

FIG. 1 is a perspective view of a mower head that incorporates the roller assembly of this invention;

FIG. 2 is a cross-sectional view of the front roller assembly depicted in FIG. 1;

FIG. 2A is a detailed view of the mid-collar of this invention;

FIG. 2B is a detailed view of an end collar of this invention;

FIG. 2C is a detailed cross-sectional view of an arm of this invention;

FIG. 3 is a detailed exploded view of the arm of the roller assembly of FIG. 1;

FIG. 4 is a plan view of a rear roller assembly of this invention attached to a mower head;

FIG. 5A is a longitudinal view of a workpiece from which a section of the roller body of this invention is formed;

FIG. 5B is a cross-sectional view of a partially formed roller body section;

FIG. 5C is a cross-sectional view of the workpiece of FIG. 5B, being further formed to shape the outer surfaces of the roller body section;

FIG. 6 is a longitudinal plan view of an alternative roller assembly of this invention; and FIG. 7 is a plan view of an alternative arm that can be incorporated into the roller assembly of this invention.

BEST MODE FOR CARRYING OUT THE INVENTION

FIG. 1 illustrates a mower head 10 to which a front roller assembly 12 of this invention is attached. This particular mower head 10 is of the type adapted to be attached to a tractor. Typically, multiple mower heads 10 are attached to a tractor so that it can be driven over large expanses of turf such as are found at golf courses or in parks. The mower head 10 includes a frame 14 to which the other components of the head are mounted. The frame 14 includes a pair of opposed end plates 16. Rotatably mounted to the end plates 16 is a cutting reel 18 that includes a number of spiral-shaped blades 20. As the mower head 10 passes over a section of turf, reel 18 rotates so that the underlying grass is cut between the blades 20 and a bed knife (not illustrated) that extends between the end plates 16 adjacent the bottom of the mower head 10.

The front roller assembly 12 and a rear roller assembly 22 (FIG. 3) are attached to the mower head frame 14 to support the mower head 10 as it travels over the ground. Roller assembly 12 includes a roller body 24 that is the actual component of the assembly that contacts the underlying ground. A shaft 26 extends axially through the roller body 24 and is coupled to the roller body so as to rotate in unison therewith. Shaft 26 has a pair of opposed end sections 27 that project away from the ends of roller body 24. Each shaft end section 27 is coupled to an arm 28 that is secured to the adjacent frame end plate 16. More particularly, each shaft end section 27 is coupled to the adjacent arm 28 by way of a self-aligning bearing assembly 30. These bearing assemblies 30 are seated in the arms 28 so that the bearing assemblies are able to rotate in two dimensions, or float, relative to the planes in which they are normally positioned.

As seen more particularly in FIG. 2, roller body 24 of the roller assembly 12 of this invention is actually formed out of two separate, equal length roller body sections 32. Each roller body section 32 is formed out of plastic material, and in particular an ultra-high molecular weight (UHMW) polyethylene plastic. In one preferred version of the invention, a suitable plastic for forming the roller body sections 32 is sold by the Menasha Corporation of Fort Wayne, Ind. under the trademark TIVAR®-100. Each roller body Section 32 is formed with an axially extending bore 33 to facilitate the positioning of the shaft 26 therethrough. The outer circumferences of the roller body sections 32 are formed to define a wave pattern 29. More particularly, wave pattern 29 is formed so that the radius along the roller body 24 continually varies along the length of the body; there are no regions along the patterned portion of the roller body that are of a constant radius.

The abutting ends of the roller body sections 32 are coupled together by a mid-collar 34. Mid-collar 34 is in the form of a symmetrically shaped ring formed of bronze or other noncorrosive metal. The mid-collar 34 is shaped so as to have a pair of opposed circular lips 36 that extend outwardly along axes parallel to the center axis of the collar. To facilitate the coupling of the mid-collar 34 to the roller body sections 32, the end of each roller body section 32 is formed to define an annular slot 40 which extends concentrically around and is spaced away from the bore 33 for receiving the adjacent mid-collar lip 36. To ensure a secure compression fit of the mid-collar 34 to the roller body section 32, annular slot 40 defines a circular boss 41 with an outer diameter that is slightly greater than the inner diameter across the annular lip 36 of the collar 34. For example, in one preferred version of the invention, the diameter across the inside wall of the mid-collar lip 36 is 1.250 inches and the outer diameter of the complementary roller body bosses 41 is 1.265 inches. In order to facilitate the coupling of the mid-collar 34 to the roller body sections 32, the inside outer edges of the collar lips 36 are formed to define small outward tapers 37, best seen in FIG. 2A.

Two end collars 48, one positioned at each end of the roller body 24, secure the shaft 26 to the roller body. Each end collar 48 is formed with an outwardly extending lip 49 that is designed to be seated in a complementary slot 50 defined in the exposed end of the adjacent roller body section 32. The end slot 50 and complementary collar lip 49 are, like the mid-collar lip 36 and boss 41 arrangement, dimensioned so as to facilitate the compression fitting of the end collar 48 over the end of the roller body shaft 26. Each end collar 48 is formed with a radially extending threaded bore 52 (FIG. 2B) in which a set screw 54 is seated. Set screw 54 is pressed against the outer surface of the shaft 26 to compression-secure the shaft to the end collar 48 so as to ensure that the roller body 24 and shaft rotate in unison.

Bearing assemblies 30 rotatably couple the shaft end sections 29 to the adjacent support arms 28. Each bearing assembly 30 includes an inner race 60 which is compression fitted over the shaft end section 29 with which it is associated. Each bearing assembly 30 further includes an outer race 62 that is fitted over the inner race 60. Ball bearings (not illustrated) disposed between races 60 and 62 ensure that the races rotate freely relative to each other. As seen in reference to FIG. 2, the outer race 62 is shaped so as to have an outer surface 64 that has an outwardly curved profile, a spherical radius, such that its largest diameter is along its lateral center line. It should also be noted that the races 60 and 62 are sealed so as to prevent the discharge of lubricating grease from the bearing assemblies 30.

Each bearing assembly 30 is seated in an opening 66 defined by the arm 28 to which the assembly 30 is attached. More particularly, as illustrated by FIG. 2C, each arm 28 has a base 67 which has an interior located circular wall which defines the associated arm opening 66. Each inner wall 68 has a spherical radius so as to provide the associated opening 66 an outwardly curved profile that is complementary to the profile of the outer race 62. The arm base 67 is further formed to define a pair of opposed cutouts 70 that extend toward the radial line along wall 68 that defines the maximum diameter of the opening 66. Cutouts 70 are provided to facilitate the seating of the bearing assemblies 30 into the openings 66 and their removal therefrom.

Each arm 28, in addition to having a base 67, has an elongated stem 72 that extends away from the base, as is best illustrated by FIG. 3. The stem 72 is formed with a longitudinally extending slot 73 which functions as a space through which a threaded fastener 76 extends to facilitate the securing of the arm 28 to the mower head frame 14. To facilitate the easy adjustment of the position of the roller assembly 12 relative to the mower head frame 14, arm 28 is provided with a set screw 78 with a head 82 to which an elongated stem 80 is attached. Set screw 78 is positioned so that the head 80 is located above the free end of the arm stem 72 and the stem is directed toward the arm base 67. The portion of the screw stem 80 immediately below the head 82 extends through an opening 83 in a block 84 that is attached to the free end of the arm stem 72. An adjustment washer 86 is coupled over the stem 80 and is located immediately below the block 84. More particularly, washer 86 is of sufficient diameter such that a portion of its outer perimeter extends into a small slotted space 90 formed by a separation of the adjacent surfaces of the top of the arm stem 72 and the base of the block. The free end of the screw stem 80 abuts a block 89 that is integrally fixed to the outer surface of the adjacent frame end plate 16.

The position of the roller assembly 12 of this invention is adjusted by first releasing the compressive force threaded fasteners 76 impose on arms 28 to hold the arms in position. Set screws 78 are then rotated so as to set the position of the arms 28, and the roller body 24-and-shaft 26 unit attached thereto, into position relative to the mower head frame 14. Threaded fasteners 76 are then tightened to restore the compressive force that locks the arms 28 in place.

Rings 94 are fitted over the portions of the shaft end sections 27 that extend beyond the outer sides of the arms 28. Each ring 94 is locked in position by a set screw 96. Rings 94 prevent the shaft end sections 27 from sliding out of the arms 28 so as to prevent the roller body-and-shaft unit from inadvertently working free from the mower head 10.

Rear roller assembly 22, as illustrated by FIG. 4, includes a roller body 96 that has a constant diameter outer surface. Roller body 96 is integrally coupled to a shaft 26 which is, in turn, coupled to the frame end plates 16 by bearing assemblies 30 in much the same way the front roller body 24 is coupled to the frame. Roller body 96, like the previously described roller body 24, is formed out of two roller body sections 98 each of which formed from UHMW polyethylene plastic. The previously described mid-collar 34 and end collars 48 are, respectively, employed to secure the body sections 98 together and secure the roller body 96 to the shaft 26.

The roller body 96-and-shaft 26 unit is coupled to a pair of fixed position arms 102, each of which is attached to separate one of the frame end plates 16. Each arm 102 is in the form of a generally solid block of metal that has two openings designed to accommodate the insertion of threaded fasteners 106 (FIG. 1) for coupling of the arm to the adjacent frame end plate 16. Each arm 102 is further formed with an opening 108 in which the associated bearing assembly 30 is seated. Arms 102 are shaped so as to have inner circular walls 110, the walls that define the openings 108, that are shaped so as to have an outwardly curved radius in order to facilitate the seating of the complementary self-aligning bearing assembly 30. Arms 102 are further formed with cutouts to facilitate the seating of the bearing assemblies 30 in the openings 108 and their removal therefrom (cutouts not illustrated).

FIGS. 5A–5C illustrate how a roller body 24-and-shaft 26 unit of this invention is manufactured. Generally, these units are constructed so that the roller bodies 24 are between 18 and 30 inches in length. FIG. 5A illustrates a basic UHMW polyethylene workpiece 120 from which a roller body section 32 is formed. The basic workpiece 120 is in the form of a cylindrical body that has a length of less than 15 inches and, more preferably, has a length of 12 inches or less. Using a turret lathe, the center bore 33 is drilled through the center of the workpiece 120. The ends of the workpiece 120 are then selectively machined to form the boss 39 and slot 40 at one end of the workpiece and the second slot 50 at the opposed end of the workpiece.

Once the workpiece 120 is partially machined, it is fitted over a mandrel 124, as depicted by FIG. 5C. The mandrel 124 includes a shaft 126 over which the workpiece 120 is fitted. A base cap 125 is secured to one end of the shaft 126 so as to be fitted in slot 48 and a top cap 127 is secured down over the slot 40 so as to cause the workpiece to rotate when the mandrel shaft is turned. In order to facilitate the coupling of cap 127 to shaft 126, cap 127 is provided with a threaded bore which is designed to be secured to complementary threading formed around the open end of the shaft, (threading not illustrated). A nut 129 is secured over the end of end cap 127 to facilitate the coupling and removal of the cap to and from the shaft 126. Once the workpiece 120 is so placed, it is rotated so that a cutting tool 130 can be employed to selectively shape the outer surface of the workpiece to finally form the roller body section 32.

As can be seen best by reference to FIG. 2, in one preferred version of the invention, the roller body section 32 is formed so that the lowest section of the wave pattern 29, a wave trough 29a, is located at the end of the roller body section 32 that is attached to the adjacent section. Once the roller body section 32 is formed, it is coupled to a complementary section 32 to form the roller body 24. Shaft 26 is inserted through the coaxial bores 33, end collars 48 are placed on the roller body, and the shaft secured to the end collars to finalize the assembly of the roller body-and-shaft unit.

Roller assemblies 12 and 22 of this invention are constructed so that the roller bodies 24 and 96 rotate in unison with the shafts 16 to which they are attached. Assemblies 12 and 22 do not include any bearing units that are located internal to the roller bodies 24 and 96. Instead, bearing assemblies 30 are located outside of the roller bodies 24 and 96. This feature of assemblies 12 and 22 eliminates one of the most labor intensive activities associated with many conventional roller assemblies, the need to essentially completely disassemble the assemblies in order to access their bearing assemblies for maintenance.

Also, the bearing assemblies 30 that hold the roller body-and-shaft units in placed are sealed units. The advantage of this feature of this invention is that it essentially eliminates the possibility that the lubricating grease used in these assemblies 30 will leak out and be deposited on the turf the mower head 10 is used to cut. Consequently there is no need to have personnel clean up the discharged grease or any need to be concerned that the grease will become an environmental pollutant.

Still another feature of the roller assemblies 12 and 22 of this invention is that the bearing assemblies 30, in addition to being externally located, float relative to the planes of the arms 28 and 102 in which they are seated. The advantage of this feature is best seen by reference to FIG. 4, wherein for the purposes of illustration, one of the mower head frame end plates 16 is shown bent significantly out of shape. As a result of this bending, the opposed arms 102 to which the roller body-and-shaft unit are attached are out of align. However, because the bearing assemblies 30 float and shift position relative to the arms 28 with which they are associated, the bearing assemblies 30 maintain their alignment so as to ensure the continued free rotation of the roller body 96 and shaft 26 unit attached thereto. Thus, in the event the structural members to which the bearing assemblies are attached, the arms or the mower head frame elements, become bent out of shape as a result of the mower head 10 striking a hard object, the roller body-and-shaft unit of this invention will continue to turn freely.

Still another advantage of this feature of the roller assemblies 12 and 22 of this invention is that it eliminates the need to exactly adjust the positions of the variable position arms 28 to ensure that they are in alignment with each other. In some versions of the invention the center opening of the two bearing assemblies 30 holding a roller body-and-shaft unit in place can be out of align by up to 5° to 10°. Thus, for example, the arms holding a roller body-and-shaft unit of 20 inches could be out of align by 1.0 to 1.5 inches and the roller body-and-shaft unit will still freely turn. Thus, when the arms are so repositioned, there is no need to spend an inordinate amount of time repositioning the arms to ensure their precise alignment.

Still another feature of the roller assemblies 12 and 22 of this invention is that the roller bodies 24 and 96 are formed out of a plastic that is relatively rigid and able to withstand being exposed to hard objects without being unduly bent out of shape. A related feature of this invention involves the method or assembling the roller bodies from two or more individual sections. An advantage of this method of constructing the roller bodies 24 and 96 is that it has proved easier to form the shaft bores 33 extending through the individual sections when the sections are of relatively short length as opposed to when they are formed in integral roller bodies of relatively long length.

FIG. 6 illustrates an alternative roller body assembly 140 of this invention. In this version of the invention, roller body 140 is assembled out of three separate sections of UHMW polyethylene plastic. More specifically, roller body 140 is formed out of two equal length outer sections 142 and a center section 144 disposed therebetween. Mid-collars 34 (FIG. 2) are used to mate the center section 144 to the outer sections 142.

An advantage of such construction is that the individual roller body sections 142, 144 are formed so that they are individually of lengths of 12 inches or less. The advantage of so forming these relatively short length roller body sections 142 and 144 is that it facilitates forming of the axial bores 33 (FIG. 5A) extending therethrough by conventional drilling. Another advantage of this invention is that it can be used to minimize the number of components, and more particularly, roller body sections, a manufacturer needs to have on hand. In order to be able to manufacture roller bodies, for example, a manufacturer could have on hand opposed end sections that are nine inches in length and also a series of center sections 142 that range in length from 2 to 12 inches. Then, depending on the specific orders for a roller bodies of particular length, the manufacturer can mate the appropriate center section to the standard outer sections in order to finally assembly the desired units.

It should be recognized that the foregoing description of this invention has been offered for illustrative purposes only. The actual form of the invention may vary widely from what has been illustrated and described. Thus, for example, bearing assemblies different from those that have been described may be used to couple the roller bearing shafts of this invention to the arms to which they are associated. Similarly, arms different than those described may also be employed in the assembly of this invention. For example, FIG. 7 illustrates an arm 150 with a stem 152 that has a number of longitudinally spaced openings 154 for receiving threaded fasteners. An advantage of this arm 150 is that it does not include any secondary components. Moreover, while the assembly has been described as being used on mower heads such as those used on tractor-type mowers, it should be clear that it could be used on other mowers, for example, manual-powered rotary mowers.

Similarly, it should also be recognized that there is no requirement that the roller bodies employed in this invention should all be made out of two section units that are formed out of UHMW polyethylene plastic. In other versions of the invention, for example, it may be desirable to form the roller bodies out of metal, rubber, or other material. Furthermore, in a similar vein, it should also be recognized that it may be desirable in some versions of the invention to form the rollers out of one-piece units, including one piece UHMW polyethylene sections. Moreover, the shapes of the roller bodies may be very different from what has been illustrated and described. Therefore, it is the object of the appended claims to cover all variations and modifications which come in the true scope and spirit of this invention.

I claim:

1. A mower head comprising:

a frame;

a cutting reel rotatably attached to the frame; and at least one roller assembly attached to said frame, said roller assembly including:

a roller body extending along said frame and positioned to move along the ground in the vicinity of said reel, said roller body having a pair of opposed ends;

a shaft extending longitudinally through said roller body having a pair of opposed end sections that extend away from said opposed ends of said roller body, said shaft being mounted to said roller body so as to rotate in unison with said roller body; and a pair of bearing assemblies, each said bearing assembly coupled to one of said opposed ends of said shaft for rotatably coupling said shaft to said frame and further being coupled to said frame so as to be seated in a specific plane and further being able to rotate in two dimensions relative to said specific plane.

2. The mower head assembly of claim 1, further including two arms, each said arm being secured to opposed ends of said frame wherein, each said bearing assembly is secured to a separate one of said arms.

3. The mower head assembly of claim 2, wherein said arms are adjustably positionable along said frame so as to allow the adjustable positioning of said roller body and said shaft relative to said reel.

4. The mower head assembly of claim 1, wherein: said bearing assemblies are formed to have outer surfaces with outwardly curved profiles; and said arms are formed to include openings wherein said bearing assemblies are seated in said openings, said openings being defined by walls having an outwardly curved profile complementary to said outer surface profile of said bearing assemblies.

5. The mower head assembly of claim 2, wherein: said bearing assemblies are formed to have outer surfaces with outwardly curved profiles; and said frame is formed to include openings wherein said bearing assemblies are seated in said openings, said opening being defined by walls having an outwardly curved profile complementary to said bearing assembly outer surface profile.

6. The mower head assembly of claim 1, wherein said roller body is formed out of ultra-high molecular weight polyethylene plastic.

7. The mower head assembly of claim 5, wherein said roller body is at least 18 inches in length and said roller body is formed out of at least two sections, each said section having a maximum length of 15 inches.

8. The mower head assembly of claim 5, wherein said roller body is at least 18 inches in length and said roller body is formed out of at least two sections, each said section having a maximum length of 12 inches.

9. The mower head assembly of claim 8, further including at least one mid-collar disposed around said shaft between adjacent said roller body sections for coupling said roller body sections together.

10. The mower head assembly of claim 3, wherein said roller body is at least 18 inches in length and said roller body is formed out of at least two sections of ultra high weight polyethyne plastic and each said section has a maximum length of 12 inches.

11. The mower head assembly of claim 2 formed out of at least two sections, each section being formed out of ultra-high molecular weight polyethylene plastic, said sections being coupled together so as to rotate in unison.

12. A roller assembly for attachment to a mower head, the mower head having a frame, said roller assembly comprising:

a roller body longitudinally oriented relative to said frame;

a shaft axially passing through and secured to said roller body so as to rotate in unison therewith, said shaft having a pair of opposed ends; and a pair of opposed bearing assemblies, each said bearing assembly being secured to one of said opposed ends of said shaft and the mower head frame for rotatably coupling said shaft to the frame, said bearing assembly being secured to said frame along a specific plane and designed to at least partially rotate in and out of said plane.

13. The roller assembly of claim 12, further including two arms, each said arm being secured to opposed ends of said frame wherein said bearing assemblies being seated in openings defined in said arms, each said bearing assembly being seated in said associated opening so as to be able to at least partially rotate in said opening.

14. The roller assembly of claim 13, wherein said arms are adjustably positionable along the mower head frame so as to allow the adjustable positioning of said roller body and said shaft relative to said reel.

15. The roller assembly of claim 14, wherein: said bearing assemblies are formed to have an outer surfaces with an outwardly curved profiles; and said arms are formed to include openings wherein said bearing assemblies are seated in said openings, said opening being defined by walls having an outwardly curved profiles complementary to said bearing assembly outer surface profiles.

16. The roller assembly of claim 12, wherein said roller body is at least 20 inches in length and said roller body is formed out of at least two sections of ultra high weight polyethylene plastic and each said section has a maximum length of 15 inches.

17. The roller assembly of claim 12, wherein said roller body is at least 15 inches in length and said roller body is formed out of at least two sections of ultra high weight polyethylene plastic and each said section has a maximum length of 12 inches.

18. The roller assembly of claim 17, further including at least one mid-collar disposed around said shaft between adjacent said roller body sections for coupling said roller body sections together.

* * * * *